(12) United States Patent
Maeda et al.

(10) Patent No.: US 9,897,063 B2
(45) Date of Patent: Feb. 20, 2018

(54) GLOW PLUG WITH PRESSURE SENSOR

(71) Applicant: NGK SPARK PLUG CO., LTD., Nagoya, Aichi (JP)

(72) Inventors: Shunsuke Maeda, Duesseldorf (DE); Yoshihiro Nakamura, Iwakura (JP); Masahiro Kawakatsu, Komaki (JP); Hiroyuki Suzuki, Kasugai (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 950 days.

(21) Appl. No.: 14/356,316

(22) PCT Filed: Apr. 18, 2013

(86) PCT No.: PCT/JP2013/002627
§ 371 (c)(1),
(2) Date: May 5, 2014

(87) PCT Pub. No.: WO2013/157269
PCT Pub. Date: Oct. 24, 2013

(65) Prior Publication Data
US 2015/0048066 A1 Feb. 19, 2015

(30) Foreign Application Priority Data

Apr. 20, 2012 (JP) .................................. 2012-096593

(51) Int. Cl.
*B23K 26/00* (2014.01)
*F02P 19/02* (2006.01)
(Continued)

(52) U.S. Cl.
CPC .......... *F02P 19/028* (2013.01); *B23K 26/244* (2015.10); *B23K 26/28* (2013.01); *F23Q 7/001* (2013.01); *F23Q 2007/005* (2013.01)

(58) Field of Classification Search
CPC ....... G01L 19/06; B23K 26/244; B23K 26/28; F02P 19/028; F23Q 7/001; F23Q 2007/005
(Continued)

(56) References Cited

U.S. PATENT DOCUMENTS 6,221,505 B1 4/2001 Shirai et al.
2006/0053875 A1 3/2006 Haussner et al.
(Continued)

FOREIGN PATENT DOCUMENTS

DE 102004063749 A1 * 7/2006 ............. G01L 19/06
JP 11-104865 A 4/1999
(Continued)

OTHER PUBLICATIONS

Communication dated Sep. 30, 2014 from the Japanese Patent Office in counterpart application No. 2013-537720.
(Continued)

*Primary Examiner* — Phuong Nguyen
(74) *Attorney, Agent, or Firm* — Sughrue Mion, PLLC

(57) ABSTRACT

A glow plug (100) includes: a housing (130) having a metal shell (110) and a cap unit (120); and a heater unit (150). A coupling member (180) is joined with the housing (130) and is also joined with the heater unit (150) at its edge portion (188), so as to enable the heater unit (150) to move along an axis line O and couple the heater unit (150) with the housing (130). When the edge portion 188 of the coupling member 180 is irradiated with a laser, at least part of the edge portion (188) melted by laser welding fills a gap (50) between the coupling member (180) and the heater unit (150) to form a welded part (210). As a result, even when there is a gap prior to welding, the weld strength between the coupling member (180) and the heater unit (150) can be maintained.

6 Claims, 12 Drawing Sheets

(51) Int. Cl.
*F23Q 7/00* (2006.01)
*B23K 26/244* (2014.01)
*B23K 26/28* (2014.01)

(58) Field of Classification Search
USPC ....... 219/260, 269, 267, 270, 209, 538, 546, 219/552, 611, 121.64
See application file for complete search history.

(56) References Cited

U.S. PATENT DOCUMENTS

2008/0264389 A1  10/2008  Fochtman et al.
2011/0204276 A1  8/2011  Huemmer et al.

FOREIGN PATENT DOCUMENTS

| JP | 2006-035285 A | 2/2006 |
| JP | 2006-084468 A | 3/2006 |
| JP | 2008-544145 A | 12/2008 |
| JP | 2009-195948 A | 9/2009 |
| JP | 2010-501811 A | 1/2010 |
| JP | 2010-23047 A | 2/2010 |
| WO | 2006/072514 A1 | 7/2006 |
| WO | 2009/053170 A1 | 4/2009 |

OTHER PUBLICATIONS

Communication dated Dec. 9, 2015 from the European Patent Office in counterpart application No. 13778945.9.

* cited by examiner

GLOW PLUG WITH PRESSURE SENSOR

CROSS REFERENCE TO RELATED APPLICATIONS

This application is a National Stage of International Application No. PCT/JP2013/002627 filed Apr. 18, 2013, claiming priority based on Japanese Patent Application No. 2012-096593 filed Apr. 20, 2012, the contents of all of which are incorporated herein by reference in their entirety.

TECHNICAL FIELD

The present invention relates to a glow plug and more specifically to a glow plug with a pressure sensor.

BACKGROUND ART

A glow plug is used as an assisting heat source in compression ignition type internal combustion engines, such as Diesel engines. The glow plug includes: for example, a heater unit configured to heat a combustion chamber in an internal combustion engine; a pressure sensor configured to measure the pressure in the combustion chamber; and a coupling member in a thin film shape joined with the heater unit and with a housing and configured to hold the heater unit in a deformable manner in an axis line direction of the glow plug. In this glow plug, the coupling member and the heater unit, and the coupling member and the housing are joined together by punching laser welding.

In the case of joining respective members together by punching welding, the interval between the members that is about 1/10 of the thickness of a member to be welded can generally maintain the bonding strength of a welded part. In other words, in the process of welding the heater unit with the coupling member of the glow plug, the bonding strength of the welded part can be maintained when the interval between the respective members is about 1/10 of the thickness of the coupling member that is the member to be welded.

CITATION LIST

Patent Literature

PTL 1: WO 2006/072514A

SUMMARY OF INVENTION

Technical Problem

The coupling member and the heater unit, however, respectively have manufacturing deviation, so that a gap is formed between the coupling member and the heater unit prior to welding. In other words, the coupling member is formed in a thin film shape and accordingly has difficulty in production at a constant thickness. The coupling member is formed to have the thickness in a range of about 0.15 mm to 0.3 mm. The heater unit, on the other hand, has a tolerance in the manufacturing process. It is accordingly difficult to control the gap formed due to the manufacturing deviation to be not greater than 1/10 of the thickness of the coupling member. In the process of joining the coupling member with the heater unit by punching welding, the material at a part of the coupling member to be welded is melted by welding and flows to fill the gap between the coupling member and the heater unit, so that the part of the coupling member to be welded is deformed to a recess. As a result, this causes partial reduction in wall thickness of the coupling member at the welded part and has difficulty in stably maintaining the strength.

By taking into account the problems described above, the object of the invention is to maintain the weld strength between a coupling member and a heater unit even when there is a gap between the coupling member and the heater unit prior to welding.

Solution to Problem

In order to solve at least part of the above problems, the invention provides various aspects and embodiments described below.

Aspect 1:

A glow plug with a pressure sensor comprising:

a housing in a cylindrical shape that is extended in a direction of an axis line;

a heater unit in a rod shape that has a rear end part placed in the housing and a front end part protruded from a front end of the housing and is movable along the direction of the axis line;

a coupling member in a thin film shape that enables the heater unit to move along the direction of the axis line and couples the heater unit with the housing; and a pressure sensor that detects a pressure based on a load transmitted via the heater unit, wherein an edge portion of the coupling member and the heater unit are joined together by laser welding performed from a coupling member side, a portion of the coupling member other than the edge portion is arranged to face the heater unit with a gap therebetween, and the edge portion of the coupling member is joined with the heater unit via a welded part formed by melting at least part of the edge portion of the coupling member by the laser welding.

In the glow plug with the pressure sensor according to Aspect 1, the edge portion of the coupling member is joined with the heater unit via the welded part formed by melting at least part of the edge portion of the coupling member by laser welding. Accordingly, the edge portion of the coupling member which has not conventionally been used for welding is melted by the heat of welding and flows into the gap formed between the coupling member and the heater unit prior to welding to fill the gap. In this way, the welded part can be formed simultaneously with preventing partial reduction in wall thickness of the coupling member at the welded part, thereby stably maintaining the weld strength.

Aspect 2:

The glow plug with the pressure sensor according to Aspect 1, wherein the welded part is formed by irradiating the edge portion of the coupling member with a laser emitted from a direction orthogonal to the axis line.

In the glow plug with the pressure sensor according to Aspect 2, the welded part is formed by irradiating the edge portion of the coupling member with a laser emitted from the direction orthogonal to the axis line. Accordingly, the welded part where the molten state of the coupling member is substantially equivalent to the molten state of the heater unit can be formed, and also the welded part can be formed by readily adjusting the radiation direction of laser.

Aspect 3:

The glow plug with the pressure sensor according to Aspect 1, wherein the welded part is formed by irradiating the edge portion of the coupling member with a laser emitted in an oblique direction crossing the axis line from a front end side to a rear end side of the heater unit.

In the glow plug with the pressure sensor according to Aspect 3, the welded part is formed by irradiating the edge portion of the coupling member with a laser emitted in the oblique direction crossing the axis line from the front end side to the rear end side of the heater unit. Accordingly, melting of the edge portion of the coupling member in the neighborhood of the gap is accelerated and the gap can be efficiently filled with the melted edge portion of the coupling member. Even when there is a relatively large gap, the strength reliability of the welded part can be maintained.

Aspect 4:

The glow plug with the pressure sensor according to Aspect 3, wherein an angle between an extension direction of the welded part and a direction orthogonal to the axis line is 10 degree or greater and is 40 degrees or less.

In the glow plug with the pressure sensor according to Aspect 4, the welding shrinkage (residual stress) of the coupling member is reduced and deterioration of the durability of the coupling member is prevented.

Aspect 5:

The glow plug with the pressure sensor according to any one of Aspects 1 to 4, wherein the welded part includes:
  a first welded part that is formed on a side of the axis line in a direction orthogonal to the direction of the axis line; and
  a second welded part that is formed at a position more distant from the axis line than the first welded part in the direction orthogonal to the direction of the axis line and has a greater width than a maximum width of the first welded part in the direction of the axis line, wherein a portion of the second welded part is extended to the heater unit.

In the glow plug with the pressure sensor according to Aspect 5, the welded part includes: the first welded part that is formed on the axis line side; and the second welded part that has a greater width than the maximum width of the first welded part and is extended to the heater unit. Accordingly, the volume of the welded part occupied in the heater unit increase, thereby improving the bonding strength.

Aspect 6:

A method for manufacturing of a glow plug with a pressure sensor including: a housing in a cylindrical shape that is extended in a direction of an axis line; a heater unit in a rod shape that has a rear end part placed in the housing and a front end part protruded from a front end of the housing and is movable along the direction of the axis line; a coupling member in a thin film shape that enables the heater unit to move along the direction of the axis line and couples the heater unit with the housing; and a pressure sensor that detects a pressure based on a load transmitted via the heater unit, the method comprising a step of:

joining the heater unit with the other end of the coupling member having a shape parallel to the heater unit by laser welding performed from a coupling member side, such that at least part of a melted edge portion of the coupling member melted by the laser welding fills a gap formed between the coupling member and the heater unit.

In the method for manufacturing of the glow plug with the pressure sensor according to Aspect 6, in the step of joining the heater unit with the other end of the coupling member by laser welding performed from the coupling member side, at least part of the melted edge portion of the coupling member, which is melted by laser welding, fills the gap formed between the coupling member and the heater unit. Accordingly, partial reduction in wall thickness of the coupling member at the welded part or at a boundary between the welded part and the coupling member is prevented, thereby stably maintaining the weld strength.

Aspect 7:

The method for manufacturing of the glow plug with the pressure sensor according to Aspect 6, wherein the step of joining the heater unit with the coupling member irradiates the edge portion of the coupling member with a laser emitted from a direction orthogonal to the axis line.

In the method for manufacturing of the glow plug with the pressure sensor according to Aspect 7, the heater unit and the coupling member are joined together by irradiating the edge portion of the coupling member with a laser emitted from the direction orthogonal to the axis line. Accordingly, the welded part can be formed by readily adjusting the direction of laser radiation.

Aspect 8:

The method for manufacturing of the glow plug with the pressure sensor according to Aspect 6, wherein the step of joining the heater unit with the coupling member irradiates the edge portion of the coupling member with a laser emitted in an oblique direction crossing the axis line from a front end side to a rear end side of the heater unit.

In the method for manufacturing of the glow plug with the pressure sensor according to Aspect 8, the heater unit and the coupling member are joined together by irradiating the edge portion of the coupling member with a laser emitted in the oblique direction crossing the axis line from the front end side to the rear end side of the heater unit. Accordingly, melting of the edge portion of the coupling member is accelerated and the gap can be efficiently filled with the melted edge portion of the coupling member. Even when there is a relatively large gap, the strength reliability of the welded part can be maintained.

In the present invention, various aspects described above may be combined each other or a part of each aspect may be omitted arbitrarily.

DESCRIPTION OF EMBODIMENTS

A. First Embodiment

A1. Schematic Configuration of Glow Plug

Figure 1A:
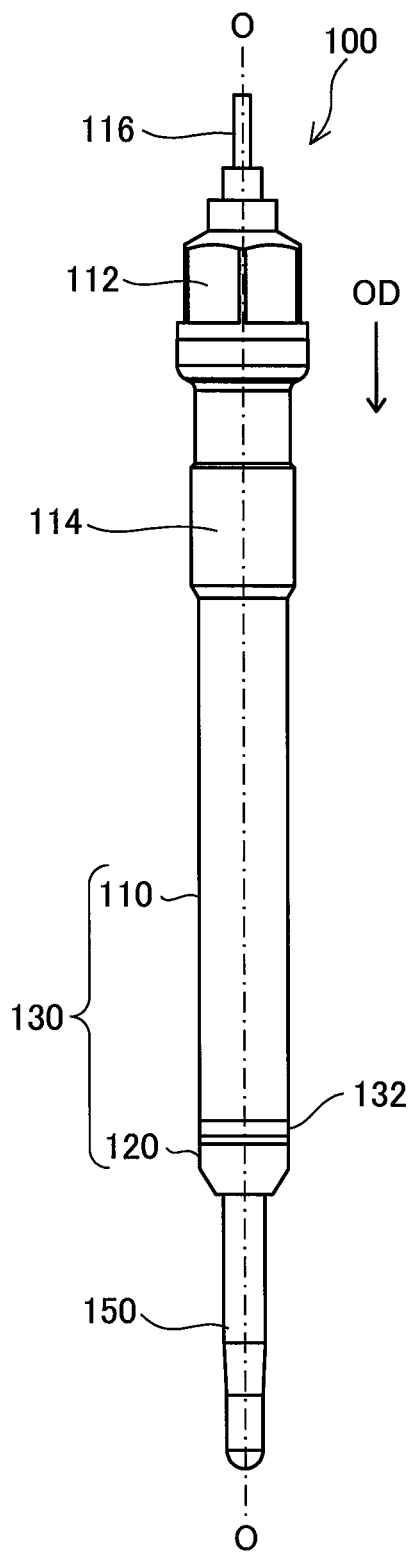
FIG. 1A is a diagram illustrating the configuration of a glow plug 100 according to a first embodiment.
Figure 1B:
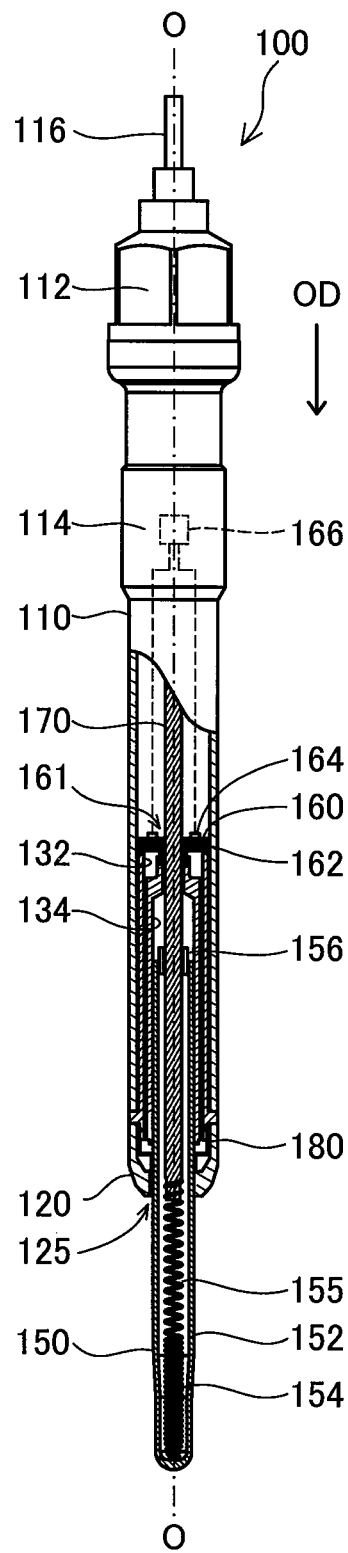
FIG. 1B is a diagram illustrating the configuration of a glow plug 100 according to a first embodiment.
Figure 2:
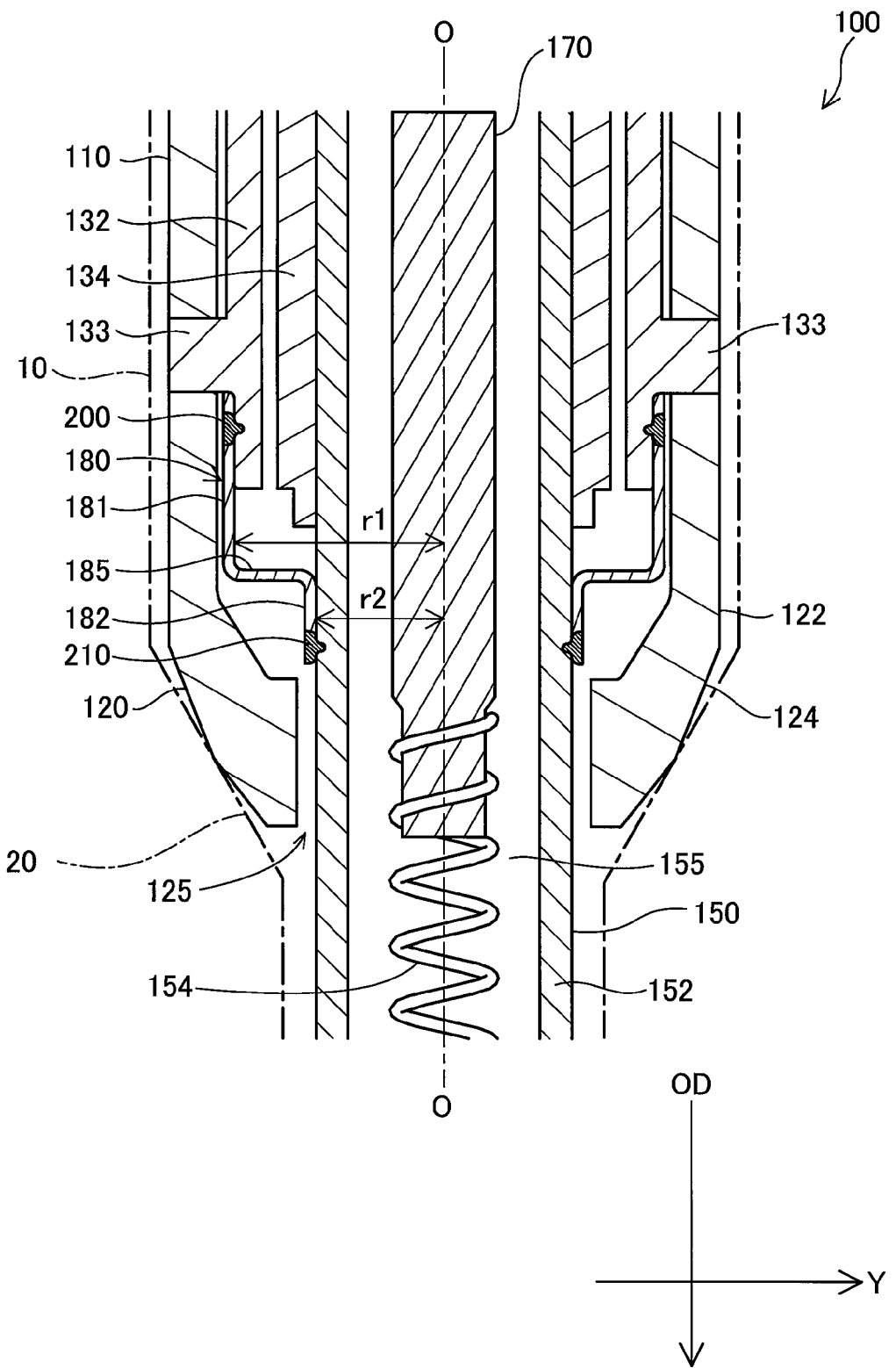
FIG. 2 is an enlarged sectional view of the neighborhood of a cap unit 120.

FIGS. 1A and 1B are diagrams illustrating the configuration of a glow plug 100 according to a first embodiment. FIG. 1A illustrates the general configuration of the glow plug 100, and FIG. 1B illustrates its partial sectional configuration. FIG. 2 is an enlarged sectional view of the neighborhood of a cap unit 120 described later. In the description below, the lower side of an axis line O of the glow plug 100 in FIGS. 1A, 1B and 2 is specified as a front end side of the glow plug 100, and the upper side is specified as a rear end side. A downward direction along the axis line O of the glow plug 100 is specified as an axis direction OD. As illustrated in FIGS. 1A and 1B, the glow plug 100 includes: a housing 130 having a metal shell 110 and a cap unit 120; a heater unit 150; a coupling member 180; and a pressure sensor 160. The metal shell 110 herein is also called "body portion" and the cap unit 120 is also called "head portion".

The metal shell 110 is a substantially cylindrical metal member made of carbon steel or stainless steel. A tool engagement structure 112 configured to engage a tool used for attachment of the glow plug 100 to an internal combustion engine is formed at a rear end of the metal shell 110. A threaded section 114 with thread grooves (not shown) formed for fixation of the glow plug 100 to a cylinder head is provided on the front end side of the tool engagement structure 112. A plurality of wirings 116 which are electrically connected with an integrated circuit 166 (described later) and a center shaft 170 (described later) in the housing 130 are inserted at the rear end of the tool engagement structure 112.

The cap unit 120 is placed at the front end of the metal shell 110. The cap unit 120 is a ring-shaped metal member made of carbon steel or stainless steel. As illustrated in FIG. 2, a cylindrical section 122 having a substantially constant outer diameter is formed on the rear end side of the cap unit 120, and a tapered section 124 tapered toward the front end is formed on the front end side.

The heater unit 150 includes a sheath tube 152, a heating coil 154 and insulating powder 155. The sheath tube 152 is made of, for example, stainless steel having excellent heat resistance and corrosion resistance and has a closed hemispherical front end and an open rear end in the metal shell 110. The heating coil 154 is a winding resistance and is placed inside of the front end side of the sheath tube 152. The center shaft 170 that is a rod-shaped metal member is inserted in the heater unit 150, and a rear end of the heating coil 154 is fixed to a front end of the center shaft 170. Electric power is externally supplied through the wirings 116 and the center shaft 170 to the heating coil 154. The insulating powder 155 of, for example, magnesium oxide, having heat resistance is packed in a gap from the heating coil 154 in the sheath tube 152. A seal member 156 for sealing the insulating powder 155 in the sheath tube 152 is inserted between the open rear end of the sheath tube 152 and the center shaft 170. The sheath tube 152 is formed by swaging process, which enhances the compactness of the insulating powder 155 packed inside thereof and improves the heat conduction efficiency. The heater unit 150 of this configuration has the rear end side placed in the metal shell 110 and the front end side placed to be protruded from an opening 125 of the cap unit 120 toward the axis direction OD.

In the housing 130, there are provided: the ring-shaped pressure sensor 160 (see FIG. 1B) placed on the rear end side of the heater unit 150; a sensor fixation member 132 configured to fix the pressure sensor 160 in the housing 130; a transmission sleeve 134 configured to transmit a displacement of the heater unit 150 along the axis line O to the pressure sensor 160; and the coupling member 180 configured to couple the outer periphery of the heater unit 150 with the inside of the housing 130.

The sensor fixation member 132 is a substantially cylindrical member made of, for example, stainless steel. The sensor fixation member 132 is placed along the inner circumference of the metal shell 110, and a brim-like flange 133 is formed in the neighborhood of its front end. This flange 133 is welded to a front end face of the metal shell 110 and to a rear end face of the cap unit 120. The outer periphery of the pressure sensor 160 is welded to the rear end of the sensor fixation member 132. According to this embodiment, the pressure sensor 160 is fixed in the vicinity of the middle portion in the housing 130 by this sensor fixation member 132.

The transmission sleeve 134 is a substantially cylindrical member made of, for example, stainless steel. The transmission sleeve 134 is placed between the sensor fixation member 132 and the heater unit 150. A front end of the transmission sleeve 134 is welded to the outer periphery of the heater unit 150 in the vicinity of a position where the flange 133 of the sensor fixation member 132 is formed. A rear end of the transmission sleeve 134 is welded to the inner circumference of the ring-shaped pressure sensor 160. The displacement of the heater unit 150 along the axis line O is transmitted to the inner circumference of the pressure sensor 160 by this transmission sleeve 134.

The coupling member 180 is connected with the housing 130 and is also connected with the heater unit 150, so as to enable the heater unit 150 to move along the axis line O and couple the heater unit 150 with the housing 130. The coupling member 180 is made of, for example, stainless steel or a nickel alloy in a thin film shape to have elasticity. The coupling member 180 includes a first cylinder section 181, a second cylinder section 182 and a joint section 185. In description of the positional relationship between a plurality of different members in the specification hereof, a side closer to the axis line O is specified as inner side in a radial direction Y of the glow plug 100, and a side farther from the axis line O is specified as outer side in the radial direction Y.

The first cylinder section 181 is welded to and connected with the housing 130 to have a first radius r1 and to be formed in a tubular shape along the axis line O. The second cylinder section 182 is welded to and connected with the heater unit 150 at an edge portion 188 to have a second radius r2 smaller than the first radius and to be formed in a tubular shape along the axis line O. In the embodiment hereof, "along the axis line O" means a state parallel to the axis line O including a tolerance.

The first cylinder section 181 and the second cylinder section 182 are connected with each other by the joint section 185. The junction between the joint section 185 and the first cylinder section 181, and the junction between the joint section 185 and the second cylinder section 182 are formed in a smooth curved shape. The joint section 185 is formed to have an inclination to the axis line O. According to the first embodiment, the joint section 185 is formed to be orthogonal to the axis line O, in other words, to be substantially parallel to a plane perpendicular to the axis line O. The coupling member 180 is produced, for example, by drawing.

According to the first embodiment, the coupling member 180 is placed in the cap unit 120. The elastic force of the coupling member 180 allows for a displacement of the heater unit 150 along the axis line O. The coupling member 180 also serves to ensure the air tightness from a combustion chamber into the metal shell 110 by coupling the heater unit 150 with the housing 130.

The coupling member 180 and the housing 130 are fixed by a welded part 200 which is formed by punching welding where the entire circumference is irradiated with a laser in a direction orthogonal to the axis line O of the coupling member 180 (hereinafter referred to as punching laser welding). Similarly, the coupling member 180 and the heater unit 150 are fixed by a welded part 210 formed by punching laser welding the entire circumference is irradiated with a laser in the direction orthogonal to the axis line O of the coupling member 180. In the specification hereof, the "direction orthogonal to the axis line O" of laser radiation is not limited to strictly orthogonal but includes a tolerance.

Figure 3:
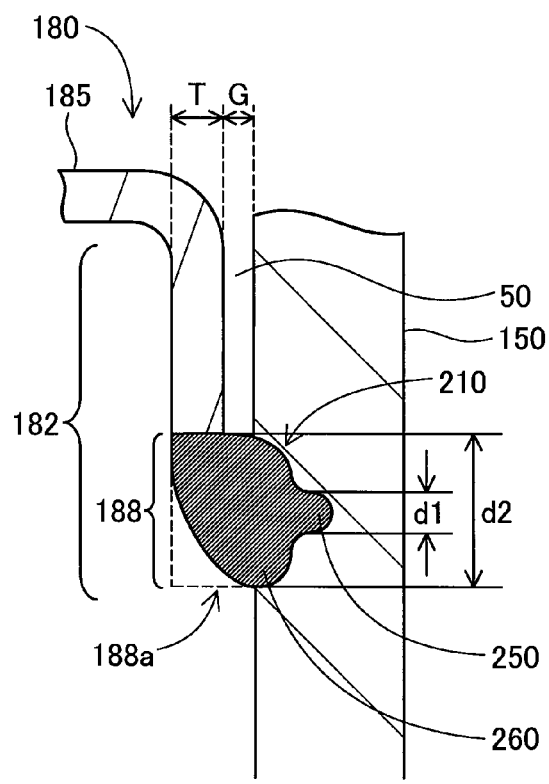
FIG. 3 is a schematic diagram illustrating the welded part 210 according to the first embodiment.

FIG. 3 is a schematic enlarged view illustrating the welded part 210 formed to join the heater unit 150 with the coupling member 180 according to the first embodiment. In FIG. 3, a front end part 188a of the coupling member 180 prior to welding is shown by a broken line. Prior to welding joint between the coupling member 180 and the heater unit 150, a gap 50 is formed between the edge portion 188 of the coupling member 180 and the heater unit 150. Formation of the gap 50 is attributed to the following reason. The coupling member 180 is formed from a very thin plate material by, for example, drawing and accordingly has difficulty in formation of a fixed thickness. The coupling member 180 is accordingly produced to have thickness in a range of 0.15 mm to 0.3 mm. The sheath tube 152 of the heater unit 150 is, on the other hand, formed by swaging process and has a relatively large tolerance in the manufacturing process. For the purpose of preventing axis deviation of the heater unit 150, the coupling member 180 and the housing 130 are joined together, before the coupling member 180 is joined with the heater unit 150. The gap 50 is accordingly formed between the second cylinder section 182 of the coupling member 180 and the sheath tube 152 of the heater unit 150, due to the respective manufacturing deviation of the coupling member 180 and the heater unit 150. A distance G of this gap 50 in the radial direction Y is not less than 1/10 of a thickness T of the coupling member 180.

In the case of joining the heater unit 150 with the coupling member 180 by punching welding, the bonding strength of a welded part can be maintained when the interval between the respective members is about 1/10 of the thickness of the member to be welded, i.e., the coupling member 180. Since the gap 50 having the distance G of not less than 1/10 of the thickness T of the coupling member 180 is, however, formed between the coupling member 180 and the heater unit 150 as described above, the coupling member 180 and the heater unit 150 are preferably joined together by punching laser welding that forms the welded part 210 by which the gap 50 is filled.

According to the first embodiment, the welded part 210 is formed by laser irradiation to the edge portion 188 of the coupling member 180. More specifically, as shown in FIG. 3, the welded part 210 is formed by filling the gap 50 between the coupling member 180 and the heater unit 150 with the melted front end part 188a (shown by the broken line) that is at least part of the melted edge portion 188 of the second cylinder section 182 of the coupling member 180, which is melted by laser welding, and by forming an alloy mixture of the melted edge portion 188 and the heater unit 150.

The welded part 210 includes a first welded part 250 and a second welded part 260. The first welded part 250 is formed on the inner side in the radial direction Y and has a maximum width d1 in the axis direction OD. The second welded part 260 is formed on the outer side of the first welded part 250 in the radial direction Y, i.e., at a position distant from the axis line O, and has a greater width d2 than the maximum width d1 of the first welded part 250 in the axis direction OD. The second welded part 260 has a part extended to the heater unit 150. In other words, the welded part 210 has the second welded part 260 formed to enter the heater unit 150. This increases the occupied volume of the welded part 210 in the heater unit 150 and improves the bonding strength.

According to the first embodiment, a fiber laser is employed for punching laser welding. The fiber laser has a narrow laser width and enables continuous irradiation. The surface of the welded part 200 or 210 by the fiber laser is accordingly formed in a narrow smooth linear shape including a series of V-shaped welding marks. Additionally, the cross section of the welded part 200 or 210 by the fiber laser includes the first welded part 250 and the second welded part 260 having different maximum widths as described above with reference to FIG. 3. The welded part is extended to even the member to be welded (heater unit 150), which is located at the farther position from the laser. This ensures the secure bonding.

The pressure sensor 160 (see FIG. 1B) includes: a ring-shaped metal diaphragm 162 having an opening 161 provided on the center to enable the center shaft 170 to pass through; and a piezoresistance element 164 joined with an upper surface (surface on the rear end side) of the metal diaphragm 162. The metal diaphragm 162 is made of, for example, stainless steel. The integrated circuit 166 placed at a specified position in the housing 130 is electrically connected with the piezoresistance element 164. As described previously, the rear end of the transmission sleeve 134 connected with the heater unit 150 is joined with the inner circumference of the metal diaphragm 162. When the heater unit 150 receives a combustion pressure and is displaced along the axis line O, the transmission sleeve 134 transmits the displacement amount to the metal diaphragm 162 and thereby bends the metal diaphragm 162. The integrated circuit 166 detects this deformation of the metal diaphragm 162 by using the piezoresistance element 164, so as to detect a combustion pressure of the internal combustion engine. The integrated circuit 166 outputs an electric signal representing this detected combustion pressure through the wirings 116 inserted at the rear end of the metal shell 110 to, for example, an external ECU.

According to the embodiment describe above, a tool is engaged with the tool engagement structure 112 of the glow plug 100, and the threaded section 114 is screwed to a plug mounting hole 10 of the internal combustion engine. This brings the cap unit 120 into contact with a seat surface 20 of the plug mounting hole 10 and fixes the glow plug 100 to the internal combustion engine.

A2. Joining Method

The glow plug 100 of the first embodiment is manufactured by producing and assembling the respective constituent members of the glow plug 100 (the metal shell 110, the cap unit 120, the heater unit 150, the pressure sensor 160 and the coupling member 180). The following describes an assembly process of the glow plug 100 of the first embodiment by welding and joining the coupling member 180 with the housing 130 and the heater unit 150 with reference to FIGS. 4 to 9B. In FIGS. 5 to 9B herein, the upper side in the drawings is specified as the front end side of the glow plug 100, and the lower side in the drawings is specified as the rear end side of the glow plug 100.

Figure 4:
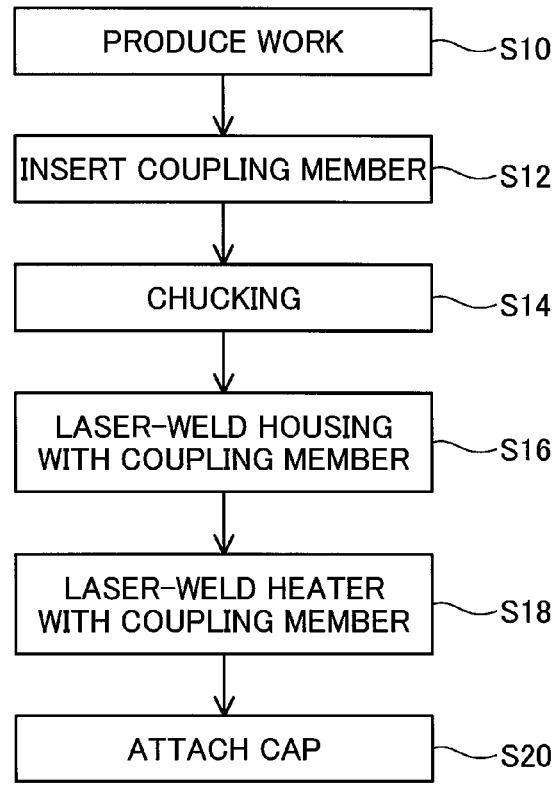
FIG. 4 is a flowchart showing an assembly process of the glow plug 100 according to the first embodiment.
Figure 5:
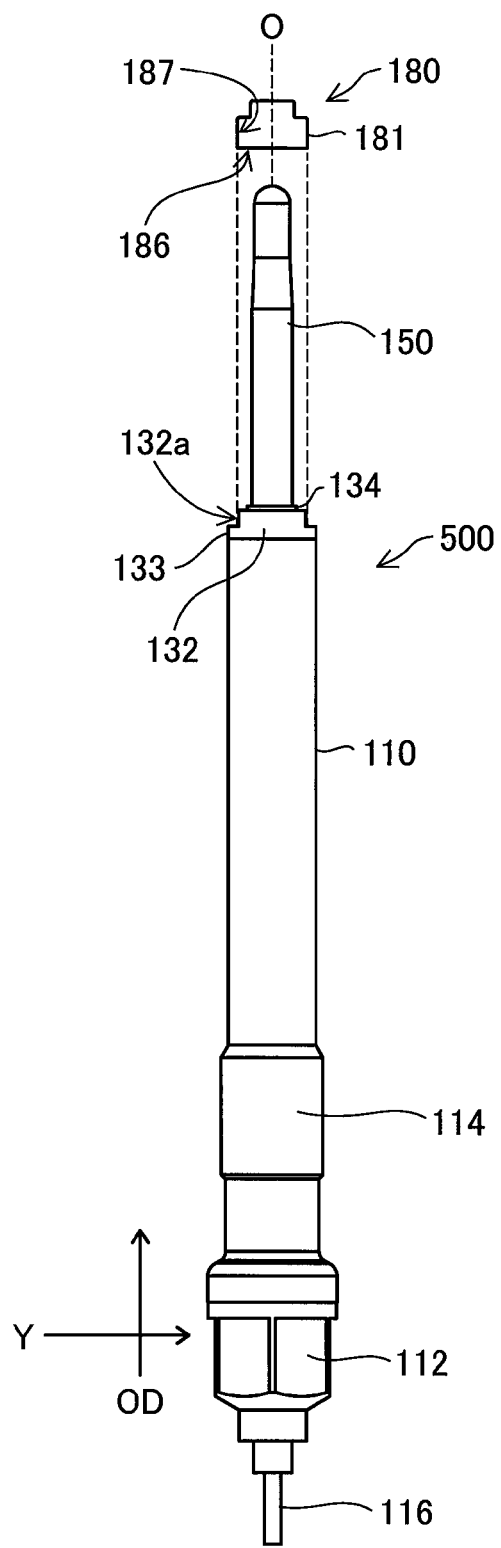
FIG. 5 is a diagram illustrating insertion of the coupling member 180 at step S12 according to the first embodiment.

FIG. 4 is a flowchart showing an assembly process of the glow plug 100 according to the first embodiment. FIG. 5 is a diagram illustrating insertion of the coupling member 180 according to the first embodiment. The assembly process first assembles the metal shell 110, the heater unit 150 and the pressure sensor 160 by a known method to produce a work 500 shown in FIG. 5 (step S10). The assembly process subsequently inserts and places the coupling member 180 in the produced work 500 (step S12). As shown in FIG. 5, the coupling member 180 is inserted along the axis line O from the first cylinder section 181-side to the front end of the work 500 (front end of the heater unit 150), until an edge portion 186 of the first cylinder section 181 abuts against the flange 133 of the sensor fixation member 132. As a result, the coupling member 180 is arranged such that an outer peripheral surface 132a of the sensor fixation member 132 on the front end side of the flange 133 is opposed to an inner circumferential face 187 of the first cylinder section 181 of the coupling member 180. At this time, the coupling member 180 is not joined with the work 500.

Figure 6:
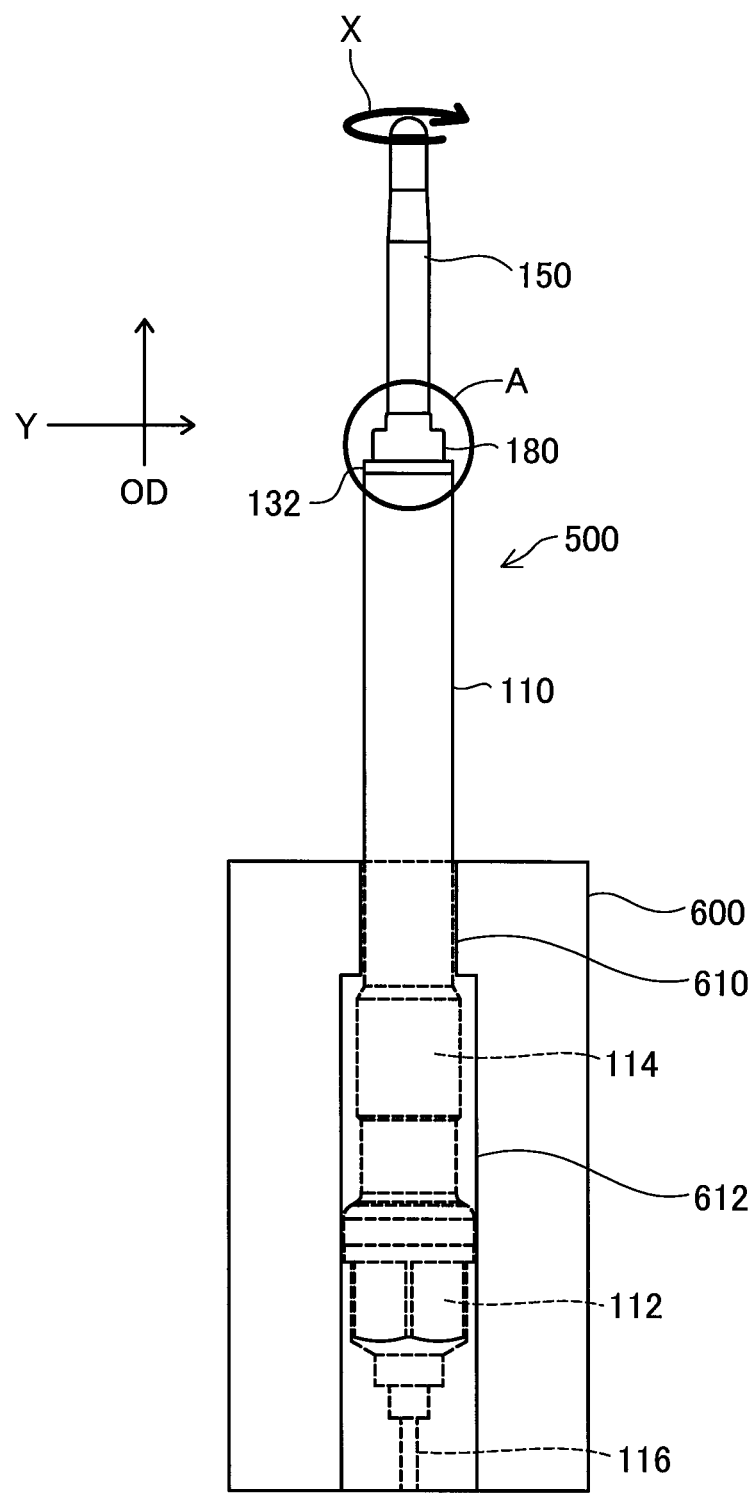
FIG. 6 is a diagram illustrating the chucking at step S14 according to the first embodiment.

The assembly process subsequently chucks the work 500 (step S14). FIG. 6 is a diagram illustrating the chucking at step S14. A chuck device 600 internally has hollow cylindrical sections 610 and 612 that communicate with each other along the axis direction OD. The diameter of the cylinder section 610 is smaller than the diameter of the cylinder section 612 in the radial direction Y. The chuck device 600 clamps and fixes the work 500 in a state that the rear end side of the work 500 is received in the cylinder sections 610 and 612.

The assembly process welds and joins the coupling member 180 inserted in the work 500 to and with the housing 130 (step S16) and subsequently welds and joins the coupling member 180 to and with the heater unit 150 (step 18). According to the first embodiment, in order to prevent deviation of the axis of the heater unit 150 from the axis line O (axis deviation), the coupling member 180 is joined with the housing 130 before the coupling member 180 is joined with the heater unit 150.

Figure 7:
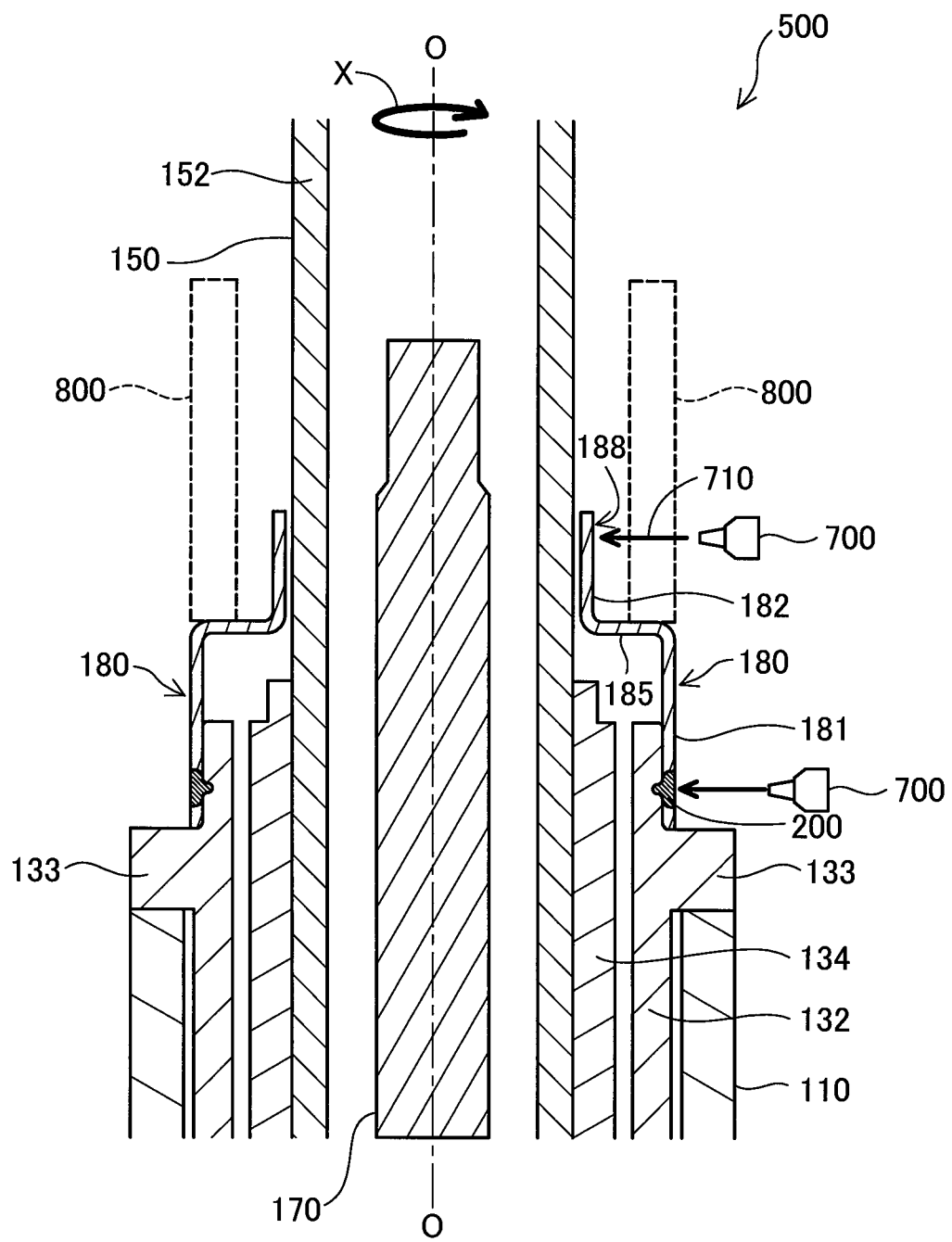
FIG. 7 is an enlarged sectional view illustrating the welding and joining at steps S16 and S18 according to the first embodiment.

FIG. 7 is an enlarged sectional view illustrating the welding and joining at steps S16 and S18 according to the first embodiment. FIG. 7 shows the enlarged cross section of an encircled area A in FIG. 6. In order to prevent the first cylinder section 181 of the coupling member 180 from coming off the flange 133 and prevent the center axis of the coupling member 180 from being inclined to the axis line O, the coupling member 180 is pressed and fixed at the joint section 185 from the front end side toward the rear end side by a pressure jig 800 in the process of welding and joining the coupling member 180 to and with the housing 130.

The work 500 (see FIG. 6) fixed by the chuck device 600 is rotated in the X direction about the axis line O. When the work 500 starts rotating, the first cylinder section 181 of the coupling member 180 inserted and placed in the work 500 is continuously irradiated with a laser emitted from outside in the radial direction Y by a fiber laser welder 700. According to the first embodiment, the first cylinder section 181 is irradiated with a laser emitted from the direction orthogonal to the axis line O. Laser radiation from the direction orthogonal to the axis line O enables the molten state of the coupling member 180 to be substantially equalized with the molten state of the housing 130. The materials constituting the coupling member 180 and the housing 130 heated by the laser are melted to form an alloy at the laser-irradiated part and thereby form the welded part 200. The coupling member 180 and the housing 130 are joined with each other by formation of the welded part 200.

After completion of formation of the welded part 200, the edge portion 188 of the coupling member 180 is continuously irradiated with a laser emitted from outside in the radial direction Y by the fiber laser welder 700. According to the first embodiment, the edge portion 188 of the coupling member 180 is irradiated with a laser emitted from the direction orthogonal to the axis line O. Laser radiation from the direction orthogonal to the axis line O enables the molten state of the coupling member 180 to be substantially equalized with the molten state of the heater unit 150. The materials constituting the coupling member 180 and the heater unit 150 heated by the laser are melted to form an alloy at the laser-irradiated part and thereby form the welded part 210. The coupling member 180 and the heater unit 150 are joined with each other by formation of the welded part 210.

Figure 8A:
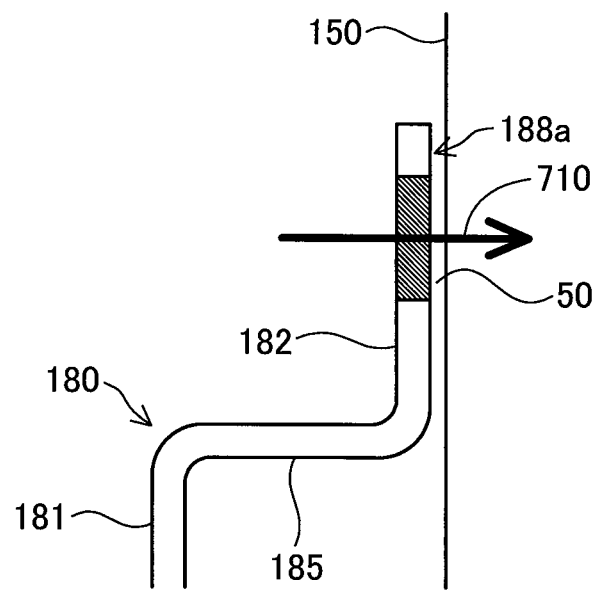
FIG. 8A is a schematic diagram illustrating formation of the welded part 210b by a conventional technique.
Figure 8B:
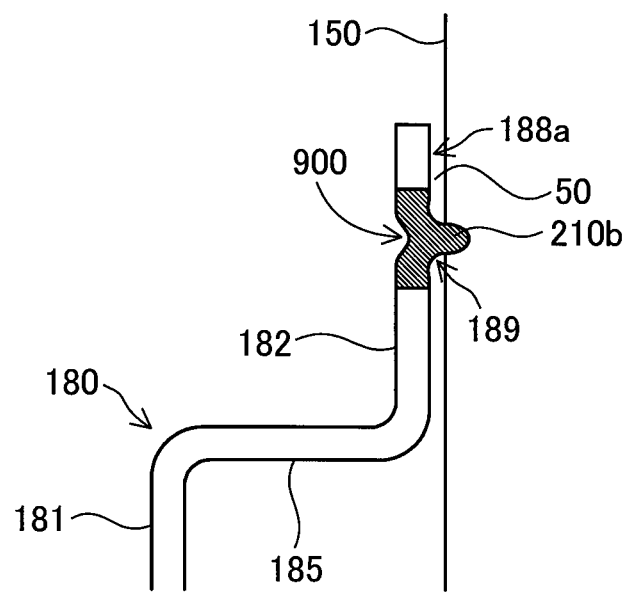
FIG. 8B is a schematic diagram illustrating a welded part 210b formed by a conventional technique.

The following describes formation of the welded part 210, based on the comparison between formation by a conventional method and formation by the method of the first embodiment. FIGS. 8A and 8B are schematic diagrams illustrating a welded part extended from the coupling member 180 to the heater unit 150 by a conventional technique. FIG. 8A shows melting of the coupling member 180 by laser radiation, and FIG. 8B shows formation of a welded part 210b.

In order to prevent the laser 710 from being deviated from the coupling member 180 and the heater unit 150 from being directly irradiated by laser radiation, the conventional method irradiates a position sufficiently distant from the front end part 188a with the laser 710 as shown in FIG. 8A. As a result, in the process of formation of a welded part extended from the coupling member 180 to the heater unit 150, the melted part of the coupling member 180 flows to fill the gap 50 between the heater unit 150 and the coupling member 180. As shown in FIG. 8B, this flow into the gap 50 causes reduction in wall thickness at the welded part 210b; for example, the coupling member 180 may have an area of a thinner wall thickness (called sink) at a boundary 189 between the coupling member 180 and the welded part 210b than the other area of the coupling member 180; or the welded part 210b itself may be deformed in the direction of laser radiation to form a recess 900. The reduction in wall thickness at the welded part 210b (the occurrence of sink) causes problems: reducing the weld strength and interfering with stably maintaining the fatigue strength of the welded part 210b. Additionally, the conventional method does not transmit the heat of the laser 710 to the front end part 188a, so that the neighborhood of the front end part 188a remains intact without contributing to formation of the welded part 210b, in other words, without affecting the bonding strength.

Figure 9A:
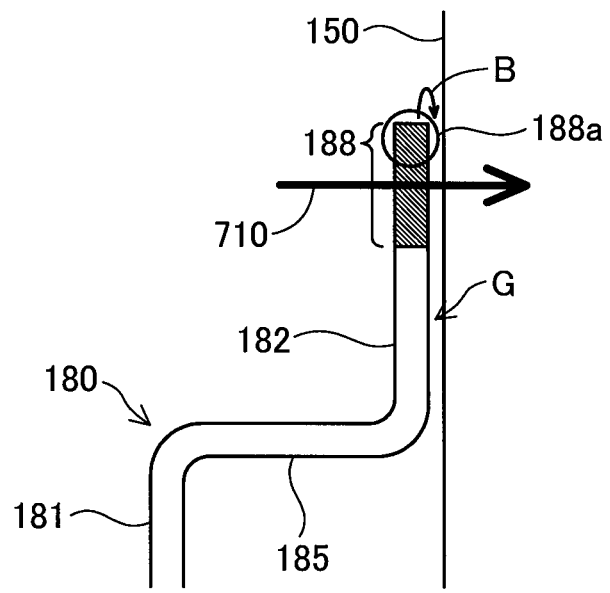
FIG. 9A is a schematic views illustrating formation of the welded part 210 at step S18 according to the first embodiment.
Figure 9B:
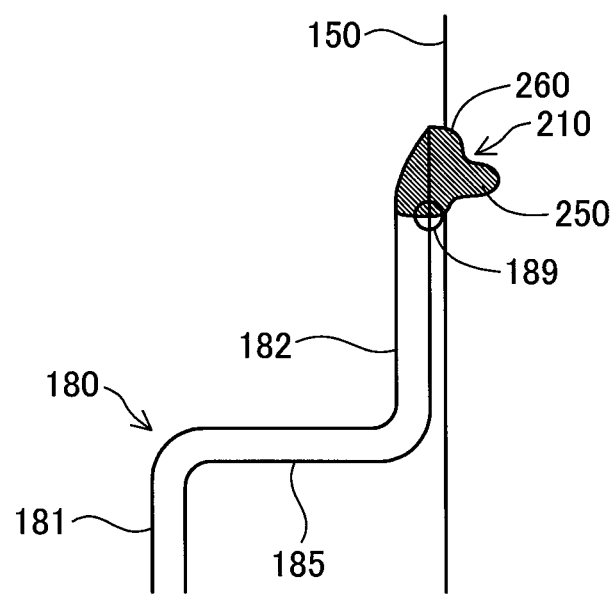
FIG. 9B is a schematic views illustrating formation of the welded part 210 at step S18 according to the first embodiment.

FIGS. 9A and 9B are schematic views illustrating formation of the welded part 210 at step S18 in detail. FIG. 9A shows melting of the front end part 188a by laser irradiation of the edge portion 188, and FIG. 9B shows filling of the gap 50 with the melted front end part 188a. According to the first embodiment, the edge portion 188 includes an area between the front end part 188a and a position distant from the front end part 188a by a predetermined distance. The position distant from the front end part 188a by the predetermined distance means a position that is distant from the front end part 188a such that the front end part 188a of the coupling member 180 can be melted by the heat of the laser 710 emitted from the fiber laser welder 700 and is adequately determined according to the performance and the laser intensity of the fiber laser welder 700 and the material and the shape of a member to be welded.

According to the first embodiment, irradiation of the edge portion 188 with the laser 710 melts the front end part 188a, which has not conventionally been used for formation of a welded part (FIG. 9A). As shown by an arrow B, at least a portion of the melted front end part 188a flows to fill the gap 50 between the heater unit 150 and the coupling member 180. As a result, as shown in FIG. 9B, this supplements the material of a required volume for formation of the welded part 210 (in other words, volume corresponding to the gap 50) and thereby enables formation of the welded part 210 extended from the edge portion 188 of the coupling member 180 to the heater unit 150, simultaneously with preventing the occurrence of any area of a thinner wall thickness (occurrence of sink) at the boundary 189 between the coupling member 180 and the welded part 210 than the other area of the coupling member 180 (FIG. 9B). The heater unit 150 and the coupling member 180 are joined with each other by formation of the welded part 210.

The assembly process then attaches the cap unit 120 to the front end of the work 500 where the heater unit 150 is welded to the coupling member 180, so as to complete the glow plug 100 (step S20).

In the glow plug 100 and the method for manufacturing of the glow plug 100 according to the first embodiment described above, the edge portion 188 of the coupling member 180 is joined with the heater unit 150 via the welded part 210 formed by melting at least part of the edge portion 188 of the coupling member 180 by laser welding. Accordingly, the edge portion 188 of the coupling member 180 which does not affect the weld strength is melted by the heat of welding and flows into the gap 50 between the coupling member 180 and the heater unit 150, so as to fill the gap 50 formed between the coupling member 180 and the heater unit 150 prior to welding. This consequently prevents partial reduction in wall thickness of the coupling member 180 at the welded part and stably maintains the weld strength.

In the glow plug 100 and the method for manufacturing of the glow plug 100 according to the first embodiment, the welded part 210 is formed by irradiating the edge portion 188 of the coupling member 180 with a laser emitted from the direction orthogonal to the axis line. Accordingly, this enables formation of the welded part 210 by readily adjusting the direction of laser radiation.

In the glow plug 100 and the method for manufacturing of the glow plug 100 according to the first embodiment, the distance of the gap 50 between the coupling member 180 and the heater unit 150 is not less than 1/10 of the thickness of the coupling member 180. Accordingly, this enables formation of the welded part 210 that maintains the strength reliability, even when the gap 50 having the distance of not less than 1/10 of the thickness of the coupling member 180 is formed between the coupling member 180 and the heater unit 150.

In the glow plug 100 and the method for manufacturing of the glow plug 100 according to the first embodiment, the welded part 210 includes: the first welded part 250 which is formed on the axis line side; and the second welded part 260 which has a greater width than the maximum width of the first welded part 250 and is extended to the heater unit 150. Accordingly, this increases the occupied volume of the welded part 210 in the heater unit 150 and improves the bonding strength.

B. Second Embodiment

A glow plug 100a of a second embodiment differs from the first embodiment in shape of a welded part 210a extended from a heater unit 150 to a coupling member 180 and in laser radiation method for formation of the welded part 210a. In the glow plug 100a of the second embodiment, the like components to the respective components of the glow plug 100 of the first embodiment are described using the like numerals and symbols used in the first embodiment. Formation of the welded part 210a according to the second embodiment is described with reference to FIGS. 10, 11A and 11B.

B1. General Structure of Welded Part

Figure 10:
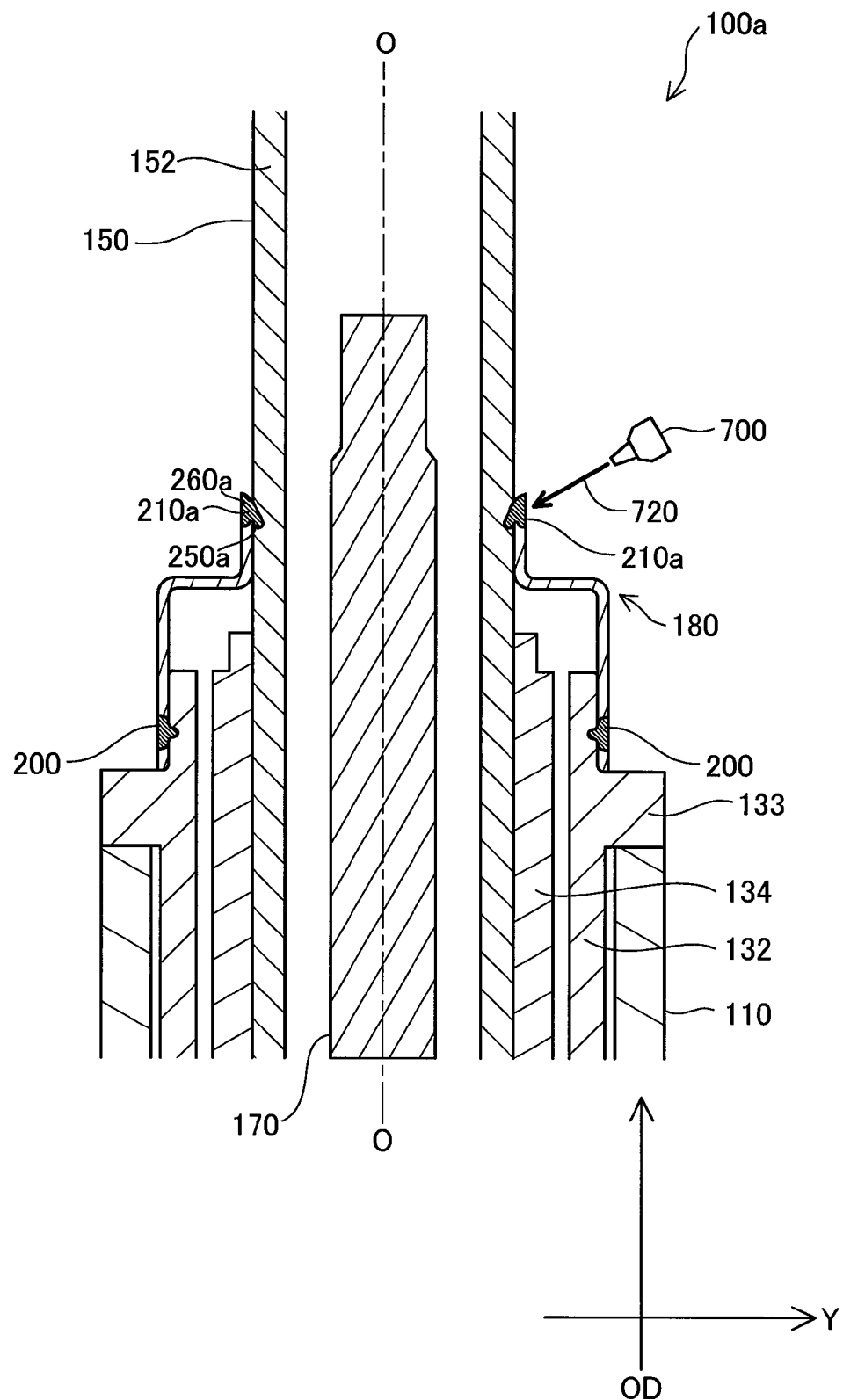
FIG. 10 is a diagram illustrating direction of laser radiation according to the second embodiment.

FIG. 10 is a diagram illustrating direction of laser radiation according to the second embodiment. A welded part 200 is formed by the same method as that of the first embodiment. After completion of formation of the welded part 200, an edge portion 188 of the coupling member 180 is continuously irradiated with a laser emitted from outside in a radial direction by a fiber laser welder 700. According to the second embodiment, the edge portion 188 of the coupling member 180 is irradiated with a laser emitted in an oblique direction crossing the axis line O from the front end side to the rear end side of the heater unit 150.

The welded part 210a includes: a first welded part 250a formed on the inner side in a radial direction Y; and a second welded part 260a formed on the outer side of the first welded part in the radial direction Y, i.e., at a position distant from the axis line O, and has a greater width than a maximum width of the first welded part 250a in the axis direction OD. The second welded part 260a is formed such that a portion of the second welded part 260a is extended to the heater unit 150.

B2. Method of Formation of Welded Part

Figure 11A:
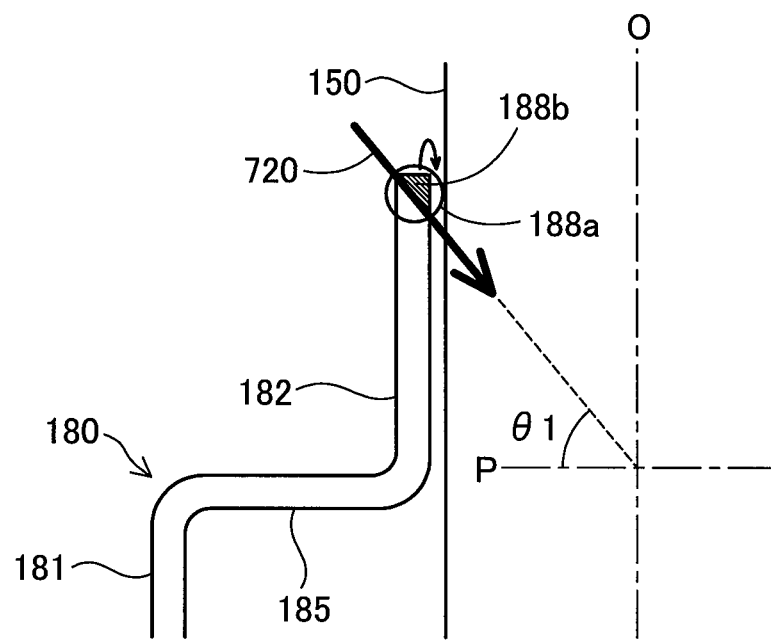
FIG. 11A is a diagram illustrating formation of the welded part 210a according to the second embodiment.
Figure 11B:
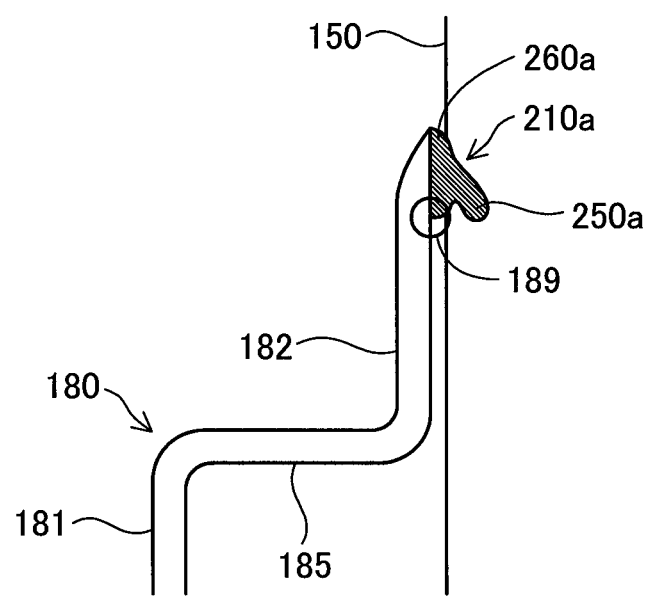
FIG. 11B is a diagram illustrating formation of the welded part 210a according to the second embodiment.

FIGS. 11A and 11B are diagrams illustrating formation of the welded part 210a according to the second embodiment. FIG. 11A shows melting of a front end part 188a by laser irradiation of the edge portion 188, and FIG. 11B shows filling of a gap 50 with the melted front end part 188a.

According to the second embodiment, the front end part 188a is melted by irradiation of the edge portion 188 with a laser 720 in the oblique direction crossing the axis line O (FIG. 11A). In other words, an angle θ1 between the irradiation direction of the laser 720 and an orthogonal line P orthogonal to the axis line O is greater than 0 degree and is less than 90 degrees. This accelerates melting of at least a portion of the front end part 188a and more specifically a portion 188b on the gap 50 side and fills the gap 50 between the heater unit 150 and the coupling member 180 with the front end part 188a including the portion 188b. As a result, as shown in FIG. 11B, this enables formation of the welded part 210a extended from the edge portion 188 of the coupling member 180 to the heater unit 150, simultaneously with preventing the occurrence of any area of a thinner wall thickness at a boundary 189 between the coupling member 180 and the welded part 210a than the other area of the coupling member 180 (FIG. 11B). The heater unit 150 and the coupling member 180 are joined with each other by formation of the welded part 210a.

Figure 12:
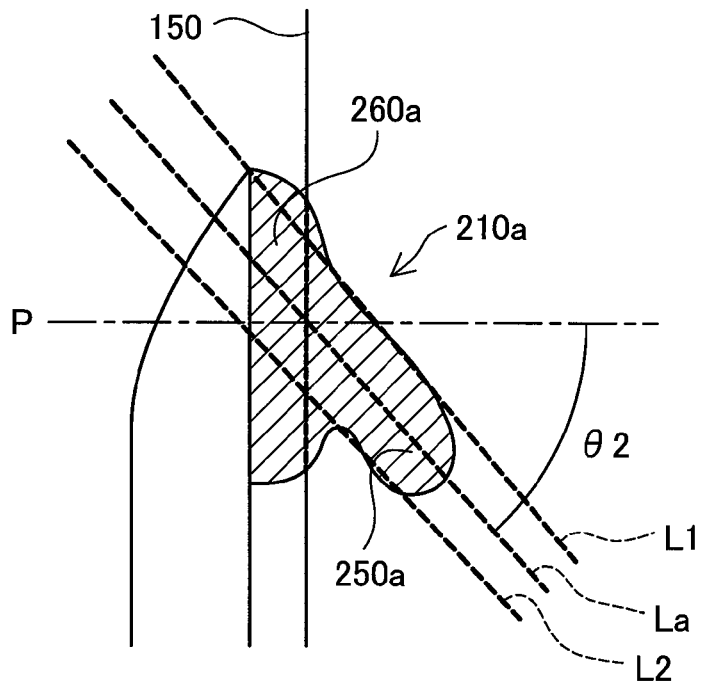
FIG. 12 is a diagram illustrating a method of estimating the radiation direction of the laser 720.

The radiation direction of the laser 720 (angle θ1) is estimable from the shape of the cross section of the welded part 210a. FIG. 12 is a diagram illustrating a method of estimating the radiation direction of the laser 720.

FIG. 12 specifically shows in closeup the neighborhood of the welded part 210a in the cross section passing through the axis line O of the glow plug 100. As described above, the welded part 210a includes the second welded part 260a and the first welded part 250a extended in the direction approaching from the second welded part 260a to the axis line O. The radiation direction of the laser 720 (angle θ1) is thought to be substantially equal to an angle θ2 between the extension direction of the first welded part 250a and the orthogonal line P orthogonal to the axis line O. The angle θ2 between the extension direction of the first welded part 250a and the orthogonal line P is accordingly estimated as the radiation direction of the laser 720 (angle θ1). In the cross section as shown in FIG. 12, the extension direction of the first welded part 250a is a direction of a mean line La between a boundary line L1 on the front end side of the first welded part 250a and a boundary line L2 on the rear end side (a group of points having the equal distances from the boundary line L1 and from the boundary line L2).

Figure 13:
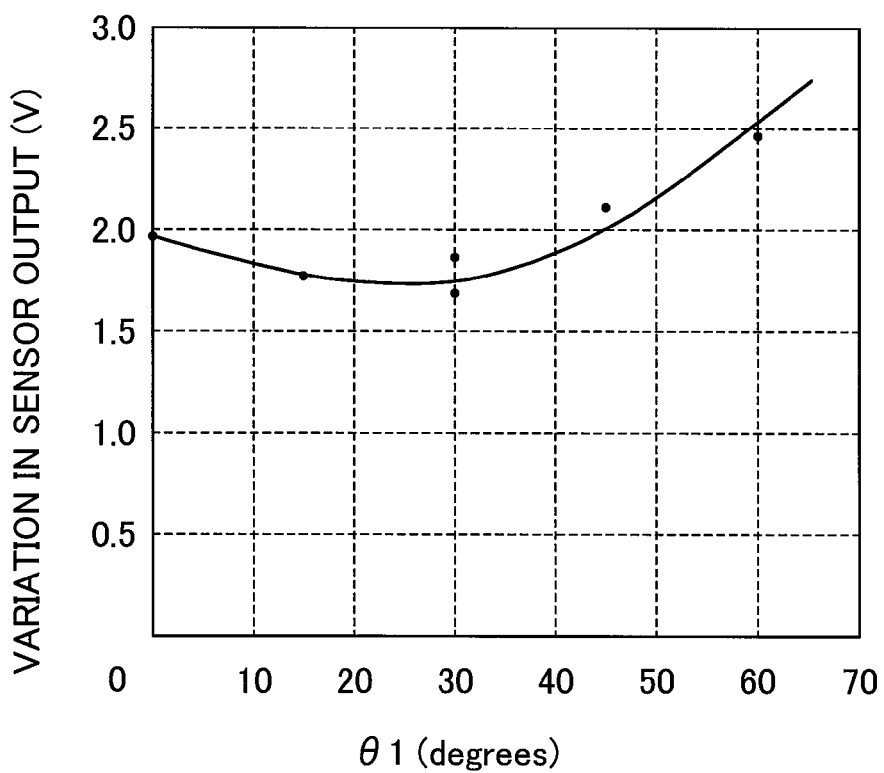
FIG. 13 is a chart showing a relationship between the radiation direction of the laser 720 and the variation in output of the pressure sensor 160.

The radiation direction of the laser 720 (angle θ1) is preferably not less than 10 degrees and not greater than 40 degrees, in terms of preventing deterioration of the durability of the coupling member 180. FIG. 13 is a chart showing a relationship between the radiation direction of the laser 720 (angle θ1) and the variation in output of the pressure sensor 160. FIG. 13 specifically shows an example of test results in measurement of a variation in output (variation in zero point) of the pressure sensor 160 after welding when the welded part 210a is formed by changing the radiation direction of the laser 720 (angle θ1). The greater variation in output of the pressure sensor 160 after welding means the greater welding shrinkage (residual stress) of the coupling member 180 and may thus reduce the durability of the coupling member 180. As shown in FIG. 13, the variation in output of the pressure sensor 160 is relatively large at the angle θ1 greater than 40 degrees. This may be attributed to that the angle θ1 greater than 40 degrees expands an area of the coupling member 180 that is melted during welding (for example, only the coupling member 180 is melted at the angle θ1 of 90 degrees) and increases the welding shrinkage. The angle θ1 less than 10 degrees, on the other hand, has difficulty in flowing the melted part of the coupling member 180 into the gap 50 and is thus undesired. The angle θ1 of not less than 10 degrees and not greater than 40 degrees causes a relatively small variation in output of the pressure sensor 160, thus relatively reducing the welding shrinkage (residual stress) of the coupling member 180 and preventing deterioration of the durability of the coupling member 180. The angle θ1 of not less than 10 degrees and not greater than 40 degrees facilitates flowing the melted part of the coupling member 180 into the gap 50 and is thus desired. The angle θ2 between the extension direction of the first welded part 250a and the orthogonal line P is substantially equal to the radiation direction of the laser 720 (angle θ1), so that the angle θ2 is preferably not less than 10 degrees and not greater than 40 degrees.

In the glow plug 100a and the method for manufacturing of the glow plug 100a according to the second embodiment described above, the welded part 210a is formed by irradiation of the edge portion of the coupling member 180 with a laser emitted in the oblique direction crossing the axis line from the front end side to the rear end side of the heater unit 150. This positively melts the edge portion of the coupling member 180 in the neighborhood of the gap 50 formed between the coupling member 180 and the heater unit 150 and ensures the material for filling the gap 50. Accordingly, this enables the gap 50 to be efficiently filled with the melted edge portion of the coupling member 180 and maintains the strength reliability of the welded part 210a. Even when the gap 50 has a relatively large distance, this enables the gap 50 to be filled sufficiently and maintains the bonding strength.

In the glow plug 100a and the method for manufacturing of the glow plug 100a according to the second embodiment, the welded part 210a includes the first welded part 250a formed on the axis line side and the second welded part 260a that has the greater width than the maximum width of the first welded part 250a and is extended to the heater unit. This increases the occupied volume of the welded part 210a in the heater unit 150 and improves the bonding strength.

The foregoing describes the various embodiments of the invention. The invention is, however, not limited to these embodiments, but a multiplicity of variations and modifications may be made to the embodiments without departing from the scope of the invention. For example, the heater including the sheath tube 152, the heating coil 154 and the insulating powder 155 is employed for the heater unit 150 in the above embodiments, but a ceramic heater may be used alternatively. In this application, an assembly of a ceramic heater and a metal outer cylinder in a tubular shape fixed to the outer circumferential face of the ceramic heater may be employed for the heater unit 150. The combustion pressure is detected by using the piezoresistance element 164 in the above embodiments, but the combustion pressure may be detected by another sensor. For example, a piezoelectric element may be used to detect the combustion pressure. In this application, employed may be a configuration where a piezoelectric element is placed between the sensor fixation member 132 and the transmission sleeve 134 in the axial direction.

REFERENCE SIGNS LIST

10 . . . mounting hole
20 . . . seat surface
50 . . . gap
100 . . . glow plug
100a . . . glow plug
110 . . . metal shell
112 . . . tool engagement structure
114 . . . threaded section
116 . . . wirings
120 . . . cap unit
122 . . . cylindrical section
124 . . . tapered section
125 . . . opening
130 . . . housing
132 . . . sensor fixation member
132a . . . outer peripheral surface
133 . . . flange
134 . . . transmission sleeve 150 . . . heater unit
152 . . . sheath tube
154 . . . heating coil
155 . . . insulating powder
156 . . . seal member
160 . . . pressure sensor
161 . . . opening
162 . . . metal diaphragm
164 . . . piezoresistance element
166 . . . integrated circuit
170 . . . center shaft
180 . . . coupling member
181 . . . first cylinder section
182 . . . second cylinder section
185 . . . joint section
186 . . . edge portion
187 . . . inner circumferential face
188 . . . edge portion
188a . . . front end part
188b . . . portion
189 . . . boundary
200 . . . welded part
210 . . . welded part
210a . . . welded part
210b . . . welded part
250 . . . first welded part
250a . . . first welded part
260 . . . second welded part
260a . . . second welded part
500 . . . work
600 . . . chuck device
610 . . . cylinder section
612 . . . cylinder section
700 . . . fiber laser welder
710 . . . laser
720 . . . laser
800 . . . pressure jig

The invention claimed is:

1. A glow plug with a pressure sensor comprising:
a housing in a cylindrical shape that is extended in a direction of an axis line; a heater unit in a rod shape that has a rear end part placed in the housing and a front end part protruded from a front end of the housing and is movable along the direction of the axis line;
a coupling member in a thin film shape that enables the heater unit to move along the direction of the axis line and couples the heater unit with the housing; and
the pressure sensor detects a pressure based on a load transmitted via the heater unit, wherein
an edge portion of the coupling member and the heater unit are joined together by laser welding performed from a coupling member side,
a portion of the coupling member other than the edge portion is arranged to face the heater unit with a gap therebetween,
the edge portion of the coupling member is joined with the heater unit via a welded part formed by melting at least part of the edge portion of the coupling member by the laser welding,
the welded part is formed by irradiating the edge portion of the coupling member with a laser emitted in an oblique direction crossing the axis line from a front end side to a rear end side of the heater unit, and
an angle between an extension direction of the welded part and a direction orthogonal to the axis line is between 10 to 40 degrees.

2. The glow plug with the pressure sensor according to claim 1, wherein
the welded part is formed by irradiating the edge portion of the coupling member with a laser emitted from a direction orthogonal to the axis line.

3. The glow plug with the pressure sensor according to claim 1, wherein
the welded part includes:
a first welded part that is formed on a side of the axis line in a direction orthogonal to the direction of the axis line; and
a second welded part that is formed at a position more distant from the axis line than the first welded part in the direction orthogonal to the direction of the axis line and has a greater width than a maximum width of the first welded part in the direction of the axis line, wherein
a portion of the second welded part is extended to the heater unit.

4. A method for manufacturing of a glow plug with a pressure sensor as claimed in claim 1 including: a housing in a cylindrical shape that is extended in a direction of an axis line; a heater unit in a rod shape that has a rear end part placed in the housing and a front end part protruded from a front end of the housing and is movable along the direction of the axis line; a coupling member in a thin film shape that enables the heater unit to move along the direction of the axis line and couples the heater unit with the housing; and a pressure sensor that detects a pressure based on a load transmitted via the heater unit, the method comprising a step of:
joining the heater unit with the other end of the coupling member having a shape parallel to the heater unit by laser welding performed from a coupling member side, such that at least part of a melted edge portion of the coupling member melted by the laser welding fills a gap formed between the coupling member and the heater unit.

5. The method for manufacturing of the glow plug with the pressure sensor according to claim 4, wherein
the step of joining the heater unit with the coupling member irradiates the edge portion of the coupling member with a laser emitted from a direction orthogonal to the axis line.

6. The method for manufacturing of the glow plug with the pressure sensor according to claim 4, wherein
the step of joining the heater unit with the coupling member irradiates the edge portion of the coupling member with a laser emitted in an oblique direction crossing the axis line from a front end side to a rear end side of the heater unit.

* * * * *